(12) United States Patent
Crabb

(10) Patent No.: US 6,478,706 B1
(45) Date of Patent: Nov. 12, 2002

(54) PLANETARY STEERING DIFFERENTIAL

(75) Inventor: Elmer R. Crabb, Granbury, TX (US)

(73) Assignee: Caterpillar Inc, Peoria, IL (US)

( * ) Notice: Subject to any disclaimer, the term of this patent is extended or adjusted under 35 U.S.C. 154(b) by 52 days.

(21) Appl. No.: 09/723,889

(22) Filed: Nov. 28, 2000

Related U.S. Application Data

(60) Provisional application No. 60/172,512, filed on Dec. 17, 1999.

(51) Int. Cl.$^7$ ............................................... B62D 11/06
(52) U.S. Cl. .............................. 475/18; 475/22; 475/28; 180/6.44
(58) Field of Search ............................ 475/22, 23, 28, 475/18; 180/6.44

(56) References Cited

U.S. PATENT DOCUMENTS

| | | | | |
|---|---|---|---|---|
| 4,434,680 A | * | 3/1984 | Riediger et al. | 475/23 |
| 4,700,794 A | * | 10/1987 | Bernhagen et al. | 180/6.44 |
| 4,882,947 A | * | 11/1989 | Barnard | 180/6.44 |
| 5,139,465 A | * | 8/1992 | Sato | 475/24 |
| 5,195,600 A | * | 3/1993 | Dorgan | 180/305 |
| 5,415,596 A | * | 5/1995 | Zulu | 475/18 |
| 6,206,798 B1 | * | 3/2001 | Johnson | 475/28 |
| 6,336,886 B1 | * | 1/2002 | Ohya et al. | 475/23 |

* cited by examiner

Primary Examiner—Rodney H Bonck
Assistant Examiner—David D. Le
(74) Attorney, Agent, or Firm—Jeff A Greene

(57) ABSTRACT

The planetary steering differential includes first and second interconnected gear trains. First and second gear trains are used for rotating output members in the same direction at the same speed in response to rotating solely a first input and holding a second input stationary. Rotation solely the second input arrangement and holding the first input arrangement stationary the output members are rotated in opposite directions at the same speed. The first input arrangement is driven by a transmission, and the second input arrangement is driven by a reversible steering motor.

21 Claims, 3 Drawing Sheets

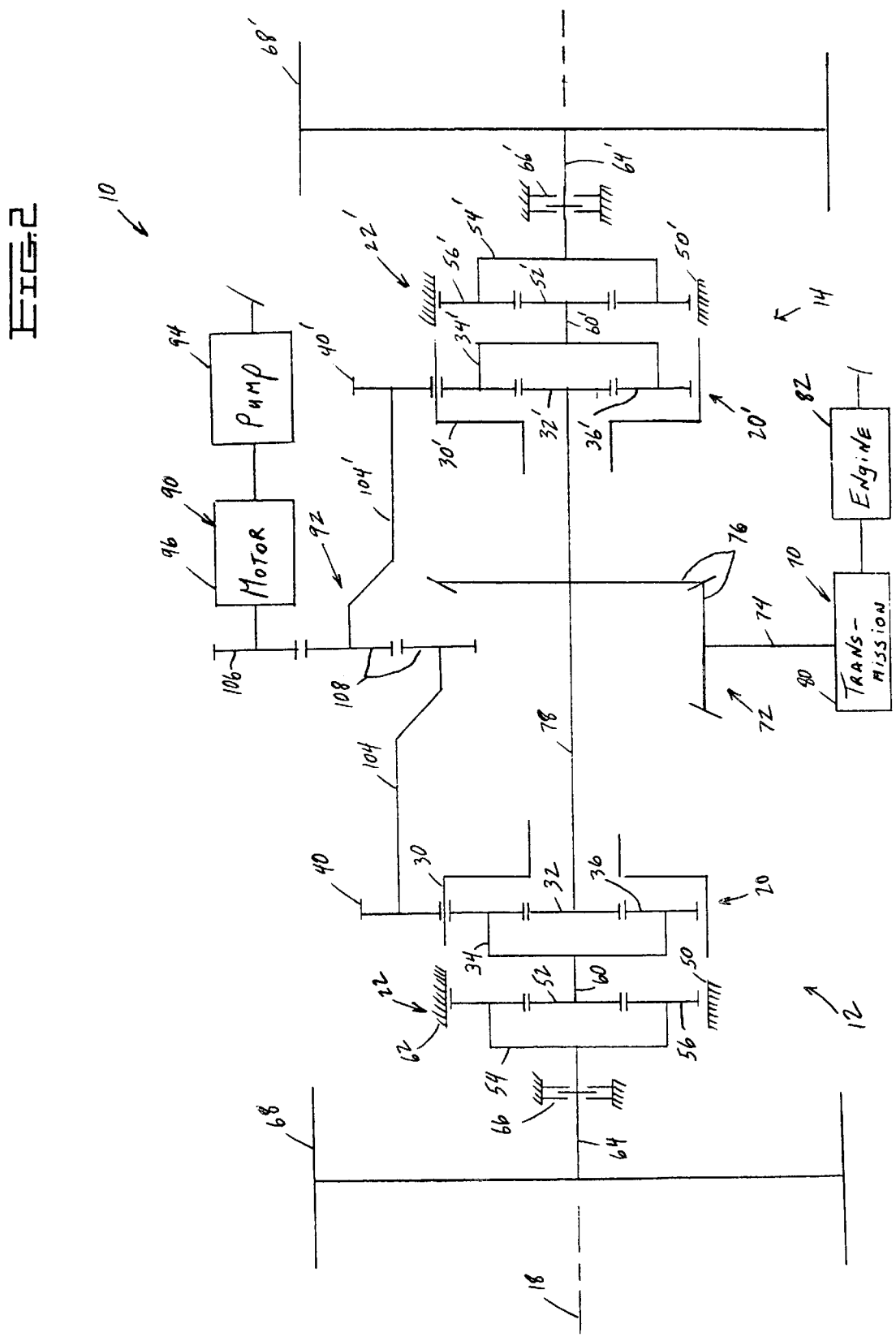

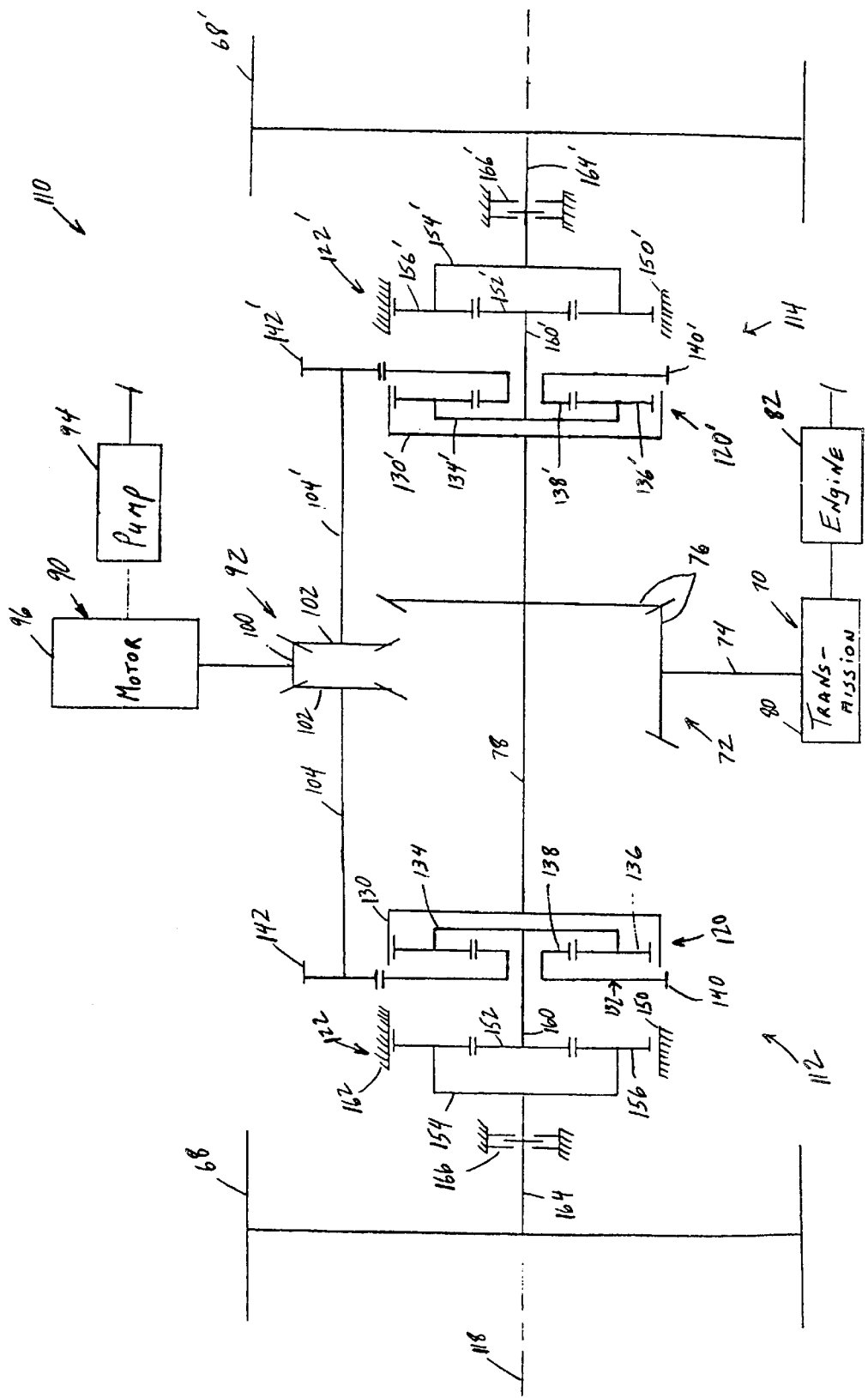

PLANETARY STEERING DIFFERENTIAL

This application claims the benefit of prior provisional application Serial No. 60/172,512 filed Dec. 17, 1999.

TECHNICAL FIELD

This invention relates to a differential for a vehicle cross drive, and more particularly to a compact and simplified planetary steering differential.

BACKGROUND ART

A large number of track laying work machines have been developed which have incorporated either clutch-and-brake steering mechanisms or geared steering mechanisms. In both of these examples, however, the drive to the opposite tracks is discontinuous when making turns. This results in poorer operation of the work machine than is desired, especially during turns in marginal ground conditions.

In some seasons of the year, for example, logging industry track laying work machines with conventional clutch-and-brake steering mechanisms cannot be maneuvered to provide useful work because when one of the steering clutches is disengaged the power to that side of the tractor is interrupted. The other side of the tractor then has to pull the total drawbar load to maintain momentum. Unfortunately, soil strength under only one side is often inadequate to carry the total load so the powered track shears the soil and loses traction. Such a loss is a particular disadvantage when it comes to making relatively small steering corrections. On the other hand, clutch-and-brake steering mechanisms are widely used because they perform well in straight-ahead work applications and are simple in construction.

In geared steering mechanisms, rather than disconnecting one track and/or bringing that track to rest, one track is driven at a lower speed than the other by having additional gear sets in the drive to each track. But these mechanisms are complex and costly in construction because duplicate planetary sets, gears, brakes and/or clutches are typically provided at both sides. Furthermore, since these mechanisms are discontinuous a lower mean track speed is provided during a turn.

Another major group of steering mechanisms includes differential mechanisms in which drive is transmitted continuously to both tracks. The simplest form thereof is a braked differential, but these are rarely used because of relatively large power losses at the steering brake. Many of the disadvantages of the braked differential are obviated by controlled differentials. In such mechanisms engine power is not wasted in the steering brakes since power is merely transferred from the inner track to the outer track. But these also have disadvantages. One major disadvantage is that when the brakes are off these mechanisms act as simple differentials so that they depend on the reaction between the track and the ground to be equal for straight-ahead operation. Since this is often not true the work machine tends to drift so that frequent corrections are required. Moreover, if one track loses traction the drive to the opposite track is reduced.

One or more of the above mentioned problems can be overcome by the use of double differentials and equivalent mechanisms which usually can counter rotate the opposite output members for spot turns. Typically, two differentials or their equivalent are arranged in parallel with their output shafts interconnected by gearing. Usually, a main drive power path is provided to one of the differentials and a steering drive power path is provided to the other one of the differentials. In some instances the steering input shaft has been driven by a hydrostatic pump and motor system, with the ability to hold the steering input shaft stationary to prevent differential action and to assure straight ahead operation of the work machine. One major deficiency thereof is that dual cross shafts and associated gearing are required so that the construction is not only complex and costly, but also an unnecessarily large housing is required for containment of the components.

The present invention is directed to overcoming one or more of the problems as set forth above.

DISCLOSURE OF THE INVENTION

A planetary steering differential adapted to be driven in use by a transmission and a steering motor. The planetary steering differential includes a first input arrangement adapted to be driven by the transmission, a second input arrangement adapted to be driven by the steering motor and first and second output members. First and second gear trains are provided for rotating the first and second output members in the same direction and at the same speed in response to rotation solely of said first input arrangement and by holding the second input arrangement stationary. The first and second gear trains cause the speed of the output members to be reduced from the speed of the first input arrangement. The output members are caused to rotate in opposite directions at the same speed in response to rotation solely of the second input arrangement and holding the first input member stationary. The first and second gear trains include first and second interconnected planetary reduction arrangements respectively. The first input arrangement is connected to the first planetary reduction arrangement and the second input arrangement is to the first planetary reduction arrangement. The first and second gear trains are arranged on and interconnected solely along a common central axis.

BRIEF DESCRIPTION OF THE DRAWINGS

FIG. 2 is a diagrammatic, elevational view or generalized planetary schematic of one embodiment of the planetary steering differential of the present invention; and FIG. 3 is a diagrammatic, elevational view or generalized planetary schematic of one embodiment of the planetary steering differential of the present invention.

BEST MODE FOR CARRYING OUT THE INVENTION

Figure 1:
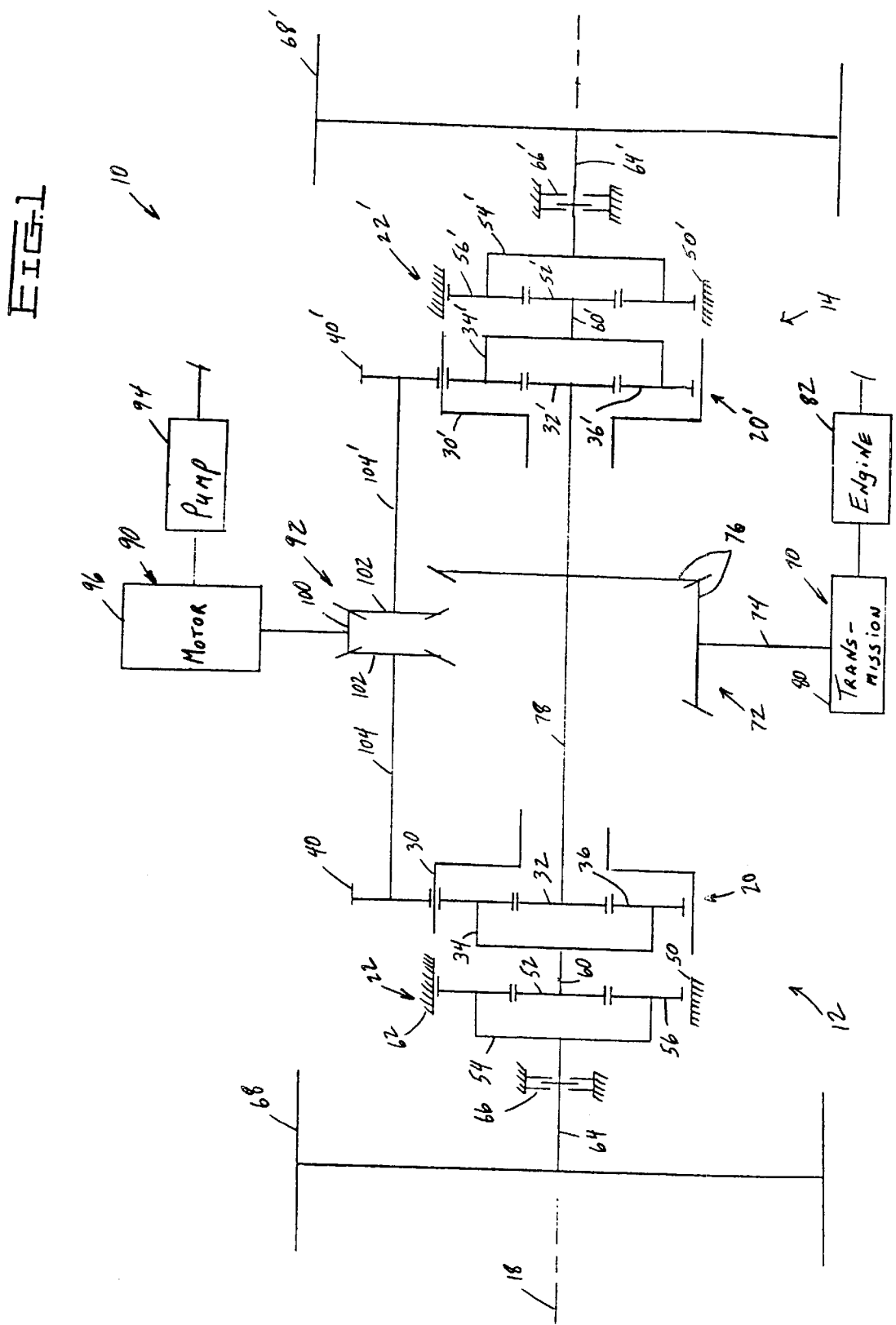
FIG. 1 is a diagrammatic, elevational view or generalized planetary schematic of one embodiment of the planetary steering differential of the present invention.

Referring initially to the diagrammatic drawing of FIG. 1, a planetary steering differential 10 is shown in simplified block-like form which has first and second interconnected gear trains 12, 14 respectively. The first and second gear trains 12, 14 are aligned along a central vehicle cross drive axis 18 which is oriented normal to the usual forward and reverse direction of travel.

The first gear train 12 includes first and second planetary reduction arrangements 20, 22. The first planetary arrangement 20 includes a ring gear 30, a sun gear 32 and a planet carrier element 34 of the typical type. A plurality of similar planet gears 36 are rotatably mounted on the carrier element 34 and are in intermeshing toothed engagement with the ring gear 30 interior and sun gear 32. In the instant embodiment the first planetary arrangement 20 provides a speed reduction and serves as a floating member train. The ring gear 30 exterior additionally is in intermeshing toothed engagement with a steering pinion 40.

The second planetary arrangement 22 includes a ring gear 50, a sun gear 52 and a planet carrier element 54. A plurality of similar planet gears 56 are rotatably mounted on the carrier element 54 and are in intermeshing toothed engagement with the ring gear 50 interior and sun gear 52. As is illustrated in FIG. 1, the second sun gear 52 is directly connected to the carrier element 34 by a shaft 60. In the instant embodiment the second planetary arrangement 22 serves as a grounded member train with the ring gear 50 and is fixedly secured to a differential housing 62, and provides an additional speed reduction.

Carrier element 54 on the left side when viewing FIG. 1 serves essentially as an output member 64. A conventional service brake assembly 66 can be associated with the output member 64 used to selectively connect that member to the differential housing 62 to brake the left side of the vehicle. The output member 64 is connected to a driving member 68, which can be a sprocket or drive wheel for a track laying work machine (not shown). The track laying work machine is for example an agricultural or earthworking tractor.

The second gear train 14 is substantially structurally and operatively similar and a mirror image of the first gear train 12. Therefore, no detailed discussion will be made of the second gear train 14 and reference will be made to like elements using a prime designation.

A transmission means 70 is desirably provided for powerably rotating at least one element of the first and second gear trains 12, 14 via a single reversible power path or first input arrangement 72. The first input arrangement 72 in this example includes an output shaft 74, from the transmission means 70, a pair of bevel gears 76 and a cross shaft 78. Preferably the transmission means 70 includes a conventional multi or variable speed and reversible transmission 80 driven by an engine 82 as is illustrated in FIG. 1. The transmission 80 could be any such conventional arrangement for example hydrostatic, split torque, or any of a number of conventional transmission arrangements. In the instant example, the transmission 80 is essentially connected to the sun gear 32 of the first planetary reduction arrangement 20 on the left side and the sun gear 32' of the first planetary reduction arrangement 20' on the right side.

Advantageously, an infinitely variable ratio steering means 90 is provided for powerably rotating at least one other element of the first and second gear trains 12,14 via a single reversible power path or second input arrangement 92. Preferably, such means 90 includes a hydraulic or hydrostatic pump 94 driven by the engine 82, and a corresponding hydraulic motor 96 which is in fluid communication with and driven by the pump 94. In the instant example the hydraulic motor 96 is essentially connected to the ring gear 30 of the first planetary reduction arrangement 20 on the left side and the ring gear 30' of the first planetary reduction arrangement 20' on the right side. In this example an output shaft 98 of the hydraulic motor 96 is connected to a bevel pinion 100. The bevel pinion 100 meshes with and drives a pair of bevel gears 102. Each of the pair of bevel gears 102 is respectively connected to a cross shaft 104, 104'. The cross shaft 104 is connected with the steering pinion 40 on the left side and the cross shaft 104' is connected to the steering pinion 40' on the right side. The steering means 90 thereby serves as the second input arrangement 92 to the steering differential 10.

An alternative to the second input arrangement 92 is shown in FIG. 2. In this example the output shaft 98 of the hydraulic motor 96 is connected to a spur gear pinion 106. The spur pinion 110 meshes with and drives a pair of spur gears 108. Each of the pair of spur gears 108 is respectively connected to the cross shaft 104, 104'. The cross shaft 104 is connected with the steering pinion 40 on the left side and the cross shaft 104' is connected to the steering pinion 40' on the right side.

An alternative embodiment is shown in FIG. 3, a planetary steering differential 110 is shown in simplified block-like form, which has first and second interconnected gear trains 112, 114 respectively. The first and second gear trains 112, 114 are aligned along the central vehicle cross drive axis 118.

The first gear train 112 includes first and second planetary reduction arrangements 120, 122. The first planetary arrangement 120 includes a ring gear 130, a sun gear 132 and a planet carrier element 134 of the typical type. A plurality of similar planet gears 136 are rotatably mounted on the carrier element 134 and are in intermeshing toothed engagement with the ring gear 130 and a first gear portion 138 of the sun gear 132. In the instant embodiment the first planetary arrangement 120 provides a speed reduction and serves as a floating member train. A second portion 140 of the sun gear 132 is additionally in intermeshing toothed engagement with a steering pinion 142.

The second planetary arrangement 122 includes a ring gear 150, a sun gear 152 and a planet carrier element 154. A plurality of similar planet gears 156 are rotatably mounted on the carrier element 154 and are in intermeshing toothed engagement with the ring gear 150 interior and sun gear 152. As is illustrated in FIG. 3, the second sun gear 152 is directly connected to the carrier element 134 by a shaft 160. In the instant embodiment the second planetary arrangement 122 serves as a grounded member train with the ring gear 150 and is fixedly secured to a differential housing 162, and provides an additional speed reduction.

Carrier element 154 on the left side when viewing FIG. 3 serves essentially as an output member 164. A conventional service brake assembly 166 can be associated with the output member 164 and used to selectively connect that member to the differential housing 162 to brake the left side of the vehicle. The output member 164 is connected to a driving member 68, which can be a sprocket, or drive wheel for a track laying work machine.

The second gear train 114 is substantially structurally and operatively similar and a mirror image of the first gear train 112. Therefore, no detailed discussion will be made of the second gear train 114 and reference will be made to like elements using a prime designation.

The transmission 80 is desirably provided for powerably rotating at least one element of the first and second gear trains 112, 114 via the first input arrangement 72. In the instant example, the transmission 180 is essentially connected to the ring gear 130 of the first planetary reduction arrangement 120 on the left side and the ring gear 130' of the first planetary reduction arrangement 120' on the right side.

In the instant example the steering means 90 is connected to the second input arrangement 92. Specifically the hydraulic motor 96 is connected to the second gear portion 140, 140' of the sun gear 132,132' in the first planetary reduction arrangement 120,120'. In this example an output shaft 98 of the hydraulic motor 96 is connected to the bevel pinion 100. The bevel pinion 100 meshes with and drives a pair of bevel gears 102,102'. Each of the pair of bevel gears 102,102' is respectively connected to a cross shaft 104,104'. The cross shaft 104 is connected with the steering pinion 142 on the left side and the cross shaft 104' is connected to the steering pinion 142' on the right side. The steering means 90 thereby serves as the second input arrangement 92 to the steering differential 110.

INDUSTRIAL APPLICABILITY

In operation, the planetary steering differential 10, 110 is preferably situated at the rear portion of the track laying work machine. The planetary steering differential 10, 110 is positioned at the rear portion of the machine in order to place the drive axis 18 thereof substantially in line with, or near, the axis of the driving members 68 that drive the left and right endless tracks. Although some of the latter members are not shown, it can be appreciated that if the driving members 68 are rotated in the same direction and at the same speed then the track laying work machine will travel straight-ahead or in reverse in a longitudinal direction. Either mode of operation is achieved by selecting the gear speed and direction of the output of the transmission 80 so that the sun gear 32,32' or the ring gear 130,130' are driven in the desired manner. Simultaneously, the hydraulic motor 96 is selectively positioned in a holding mode of operation to hold the ring gear 130,130' or the sun gear 32,32' stationary and to assure that both output members 64,64' will rotate at the same speeds without drift.

Specifically, with reference to FIGS. 1 and 2, the sun gear 32 can be rotated in a clockwise direction, when viewing along the axis 18 in FIG. 1 from the right, by the transmission 80. The ring gear 30 is held stationary by steering pinion 40. The plurality of planetary gears 36 will be forced to rotate in a counterclockwise direction around the sun gear 32. Also, the interconnected the carrier element 34 and shaft 60 will rotate together in a counterclockwise direction causing the sun gear 52 to rotate therewith. The plurality of planetary gears 56 are then forced to rotate in a clockwise direction around the sun gear 52. The carrier element 54 will then rotate in a clockwise direction causing the output element 64 and the drive member 68 to move the track laying work machine in a forward direction. Note that the ring gear 50 is held to achieve this straight-ahead mode of operation. It should be appreciated that the prime designated elements of the second gear train 14 will operate in a similar fashion and rotate in a direction mirrored to the counter parts in the first gear train 12.

If a steering correction is desired while traveling, the engine driven pump 94 is selectively coupled to the hydraulic motor 96 to drive it in either direction of rotation causing the steering pinions 40,40' to rotate at the same speed and in opposite directions. Assuming that a turn to the right is desired while traveling forward, then the motor will be powered to drive the ring gear 30 in a clockwise direction, when viewing along the axis 18 in FIG. 1 from the right, and the ring gear 30' in a counterclockwise direction. This causes a reaction on the planetary gears 36 such that the speed of the carrier element 34 and thereby the drive element 68 is increased. On the other hand this reactions causes the speed of the planetary gears 36' and the carrier element 34' and thereby the drive member 68' is reduced. Since the speed of the left output member or drive axle 68 increases and the right output member or drive axle 68' decreases a steering correction to the right results.

By reversing the direction of rotation of the hydraulic motor 96 a steering correction to the left can be made. Advantageously, power is continuously supplied to both sides of the track laying work machine throughout a turn with the planetary steering differential 10, and the average speed of the opposite output members 68,68' remains unchanged and equal to a preselected proportion of the output speed of transmission 80.

In any mode of operation, the service brake assemblies 66,66' can be operated together to brake the vehicle. Such operation is desirably independent of the steering function.

In order for the track laying work machine to make a spot turn the transmission 80 is selectively controlled to hold the sun gears 32,32' stationary. Then the motor can be operated in either direction to force the drive members 68,68' to rotate in opposite directions at the same speed.

Specifically, with reference to FIG. 3, the sun gear 130 can be rotated in a clockwise direction, when viewing along the axis 118 in FIG. 3 from the right, by the transmission 80. The sun gear 132 is held stationary by steering pinion 40. The plurality of planetary gears 136 will be forced to rotate in a counterclockwise direction around the sun gear 132. Also, the interconnected the carrier element 134 and shaft 160 will rotate together in a counterclockwise direction causing the sun gear 152 to rotate therewith. The plurality of planetary gears 156 are then forced to rotate in a clockwise direction around the sun gear 152. The carrier element 154 will then rotate in a clockwise direction causing the output element 164 and the drive member 68 to move the track laying work machine in a forward direction. Note that the ring gear 150 is held to achieve this straight-ahead mode of operation. It should be appreciated that the prime designated elements of the second gear train 114 will operate in a similar fashion and rotate in a direction mirrored to the counter parts in the first gear train 112.

If a steering correction is desired while traveling, the engine driven pump 94 is selectively coupled to the hydraulic motor 96 to drive it in either direction of rotation causing the steering pinions 142,142' to rotate at the same speed and in opposite directions. Assuming that a turn to the right is desired while traveling forward, then the motor will be powered to drive the sun gear 132 in a clockwise direction, when viewing along the axis 118 in FIG. 3 from the right, and the sun gear 132' in a counterclockwise direction. This causes a reaction on the planetary gears 136 such that the speed of the carrier element 134 and thereby the drive element 168 is increased. On the other hand this reactions causes the speed of the planetary gears 136' and the carrier element 134' and thereby the drive member 168' is reduced. Since the speed of the left output member or drive axle 168 increases and the right output member or drive axle 168' decreases a steering correction to the right results.

By reversing the direction of rotation of the hydraulic motor 96 a steering correction to the left can be made. Advantageously, power is continuously supplied to both sides of the track laying work machine throughout a turn with the planetary steering differential 110, and the average speed of the opposite output members 68,68' remains unchanged and equal to a preselected proportion of the output speed of transmission 80.

In any mode of operation, the service brake assemblies 166,166' can be operated together to brake the vehicle. Such operation is desirably independent of the steering function.

In order for the track laying work machine to make a spot turn the transmission 80 is selectively controlled to hold the ring gears 130,130' stationary. Then the motor can be operated in either direction to force the drive members 68,68' to rotate in opposite directions at the same speed.

What is claimed is:

1. A planetary steering differential adapted to be driven in use by a transmission and a steering motor, comprising:

a first input arrangement adapted to be driven by the transmission;

a second input arrangement adapted to be driven by the steering motor;

first and second output members;

first and second gear trains for rotating said first and second output members in the same direction and at the same speed in response to rotation solely of said first input arrangement and holding said second input arrangement stationary with the speed of the output members being reduced from the speed of the first input arrangement, and for rotating said output members in opposite directions at the same speed in response to rotation solely of said second input arrangement and holding said first input member stationary;

said first and second gear train each including first and second interconnected planetary reduction arrangements respectively, said first input arrangement being connected to said first planetary reduction arrangement and said second input arrangement being connected to said first planetary reduction arrangement; and said first and second gear trains being arranged on and interconnected solely along a common central axis.

2. The planetary steering differential of claim 1 wherein each of said first and second planetary reduction arrangements includes a ring gear, a sun gear and a carrier element.

3. The planetary steering differential of claim 2 wherein said carrier element of said first planetary reduction arrangement is connected to said sun gear of said second planetary reduction arrangement for joint rotation.

4. The planetary steering differential of claim 2 wherein said ring gear of said second planetary reduction arrangement is held continuously stationary.

5. The planetary steering differential of claim 2 wherein said sun gear of said first planetary reduction arrangement is connected to said first input by a cross shaft.

6. The planetary steering differential of claim 2 wherein said ring gear of said first planetary reduction arrangement is connected to said first input by a cross shaft.

7. The planetary steering differential of claim 2 wherein said ring gear of said first planetary reduction arrangement is connected to said second input by a steering pinion.

8. The planetary steering differential of claim 2 wherein said sun gear of said first planetary reduction arrangement is connected to said second input by a steering pinion.

9. The planetary steering differential of claim 1 wherein said second input includes a bevel pinion, a pair of bevel gears, and cross shafts.

10. The planetary steering differential of claim 1 wherein said second input includes a pinion, a pair of spur gears, and cross shafts.

11. The planetary steering differential of claim 1 wherein said first and second output members are connected to said planet carrier elements of said second planetary reduction arrangements.

12. A planetary steering differential adapted to be driven in use by a transmission and a steering motor, comprising:

a first input adapted to be driven by the transmission;

second input adapted to be driven by the steering motor;

first and second output members;

first and second gear trains for rotating said first and second output members in the same direction and at the same speed in response to rotation solely of said first input and holding said second input stationary with the speed of the first and second output members being reduced from the speed of the first input member, and for rotating said first and second output members in opposite directions at the same speed in response to rotation solely of said second input through a steering input power path and holding said first input member stationary, said first and second gear trains each including first and second interconnected planetary reduction arrangements each individually having a ring gear, a sun gear and a carrier element, a one of said ring gear, sun gear and carrier element of said first planetary reduction arrangements being connected to said first input arrangement and another one of said ring gear, sun gear, and carrier element of said first planetary reduction arrangement being connected to said second input arrangement, first and second planetary reduction arrangements being arranged on and interconnected solely along a common central axis.

13. The planetary steering differential of claim 12 wherein said carrier element of said first planetary reduction arrangement is connected to said sun gear of said second planetary reduction arrangement for joint rotation.

14. The planetary steering differential of claim 12 wherein said ring gear of said second planetary reduction arrangement is held continuously stationary.

15. The planetary steering differential of claim 12 wherein said sun gear of said first planetary reduction arrangement is connected to said first input by a cross shaft.

16. The planetary steering differential of claim 12 wherein said ring gear of said first planetary reduction arrangement is connected to said first input by a cross shaft .

17. The planetary steering differential of claim 12 wherein said ring gear of said first planetary reduction arrangement is connected to said second input by a steering pinion.

18. The planetary steering differential of claim 12 wherein said sun gear of said first planetary reduction arrangement is connected to said second input by a steering pinion.

19. The planetary steering differential of claim 12 wherein said second input includes a bevel pinion, a pair of bevel gears, and cross shafts.

20. The planetary steering differential of claim 12 wherein said second input includes a pinion, a pair of spur gears, and cross shafts.

21. The planetary steering differential of claim 12 wherein said first and second output members are connected to said planet carrier elements of said second planetary reduction arrangements.

\* \* \* \* \*